Oct. 18, 1932.　　　J. V. GIESLER　　　1,882,803
VALVE
Filed Nov. 25, 1929
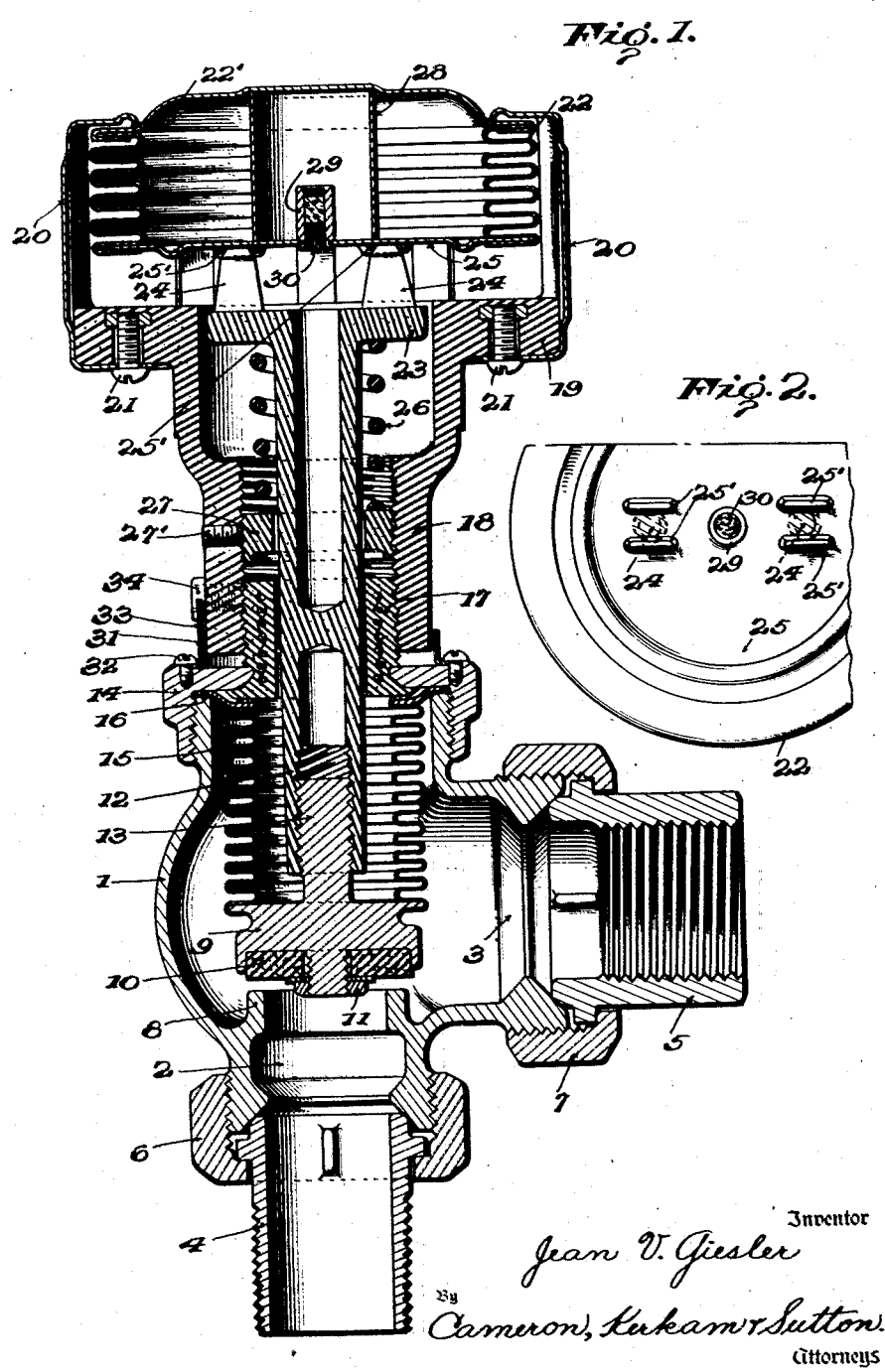

Patented Oct. 18, 1932

1,882,803

UNITED STATES PATENT OFFICE

JEAN V. GIESLER, OF KNOXVILLE, TENNESSEE, ASSIGNOR TO THE FULTON SYLPHON COMPANY, OF KNOXVILLE, TENNESSEE, A CORPORATION OF DELAWARE

VALVE

Application filed November 25, 1929. Serial No. 409,701.

This invention relates to thermostatically operated valves adapted to automatically control the flow of a fluid in accordance with variations in temperature.

One of the objects of the invention is to provide a novel thermostatically operated valve embodying means for manually controlling the same independently of the thermostatic operation.

Another object is to provide a novel thermostatically operated valve which can be adjusted to control the flow of a heating or cooling medium so as to maintain any one of a plurality of desired temperatures.

A further object is to provide a novel valve which can be completely closed or opened to any desired extent by hand, and when opened by hand, may be automatically opened and closed by suitable thermostatic means in accordance with temperature variations.

Another object is to provide a thermostatically operated valve unit of the character described which can be installed in a line through which heating or cooling medium flows but is insulated from heating or cooling effects of the medium in the line.

A still further object is to provide a novel thermostatically operated valve of simple, durable construction, which is efficient and reliable in operation. Other objects will appear more fully hereinafter.

The invention is capable of a variety of mechanical expressions, one of which, for purposes of illustration, is shown in the accompanying drawing, but it is to be expressly understood that said drawing is for purposes of illustration only and is not to be construed as a definition of the limits of the invention, reference being had to the appended claims for this purpose.

In said drawing,

Fig. 1 is a longitudinal section through a device embodying the invention; and

Fig. 2 is a detail of a part of Fig. 1.

The invention in the form shown is embodied in a thermostatically operated valve unit particularly designed for controlling the flow of a heating medium, such as steam, in the individual radiators of a heating system, but it will be understood that it is not limited to this particular use, but may be employed for the control of the flow of any suitable heating or cooling medium for any purpose. A valve body or casing 1 of any suitable construction is provided with outlet and inlet passages 2 and 3 respectively, to which tail pipes 4 and 5 may be connected by nuts 6 and 7 for the purpose of connecting the valve unit in the line. A valve seat 8 is formed in the casing 1 in any suitable manner, and a valve 9 is movable toward and away from seat 8 to control the flow of the heating medium through the valve. Preferably valve 9 is provided with a disk 10 of any suitable material held thereon by means of a suitable washer and nut 11. Said valve is operated toward and away from its seat 8 by a valve stem 12, preferably having threaded engagement with a stem 13 formed on the valve 9, the stem 12 extending outwardly of the valve casing through an opening formed in a cap nut 14 screwed thereon. A flexible corrugated wall 15 surrounds the stem 12 and is provided at one end with a flange 16 clamped tightly between the cap nut 14 and the body 1, the other end of said wall being secured to the valve 9 in any suitable manner as by soldering. Leakage from the valve body is effectively prevented by the seal formed by the flexible wall 15 and at the same time the valve 9 is constrained against rotation.

The valve stem 12 is adapted to be actuated to open and close the valve 9 either by hand or automatically by means of suitable thermostatic means responsive to temperature variations, these two operations taking place independently of one another. In the form shown, one of these results is accomplished by rotating the stem 12 on the stem 13 so as to screw the valve 9 toward or away from its seat 8, and the other by reciprocating stem 12 or shifting it longitudinally to move the valve 9. Preferably, a manually rotatable member of any suitable type is mounted on the valve casing and adapted by suitable means to rotate the stem 12 while permitting free longitudinal movement of the latter in response to thermostatic means. In the form shown, a tubular member 17 is rigidly secured to the cap nut 14 in any suitable manner and is exteriorly threaded to receive an operating member 18 which also affords a support for a thermostat. Said tubular support 18 is provided at its upper end with a flange 19, and a spider 20, secured to flange 19 by suitable means such as screws 21, carries a thermostat 22, here shown as of the bellows type, charged with a suitable thermo-sensitive fluid. Preferably the spider 20 has frictional engagement only with the normally stationary head 22' of the thermostat 22, for a purpose described hereinafter. The valve stem 12 extends upwardly through the tubular support 18 and terminates in a head 23 carrying a suitable number of posts or pins 24 which engage the movable head 25 of the bellows 22. Posts 24 are resiliently urged into engagement with the movable head 25 by suitable means, such as a coil spring 26 bearing at its upper end against the under side of head 23 and at its lower end on an adjusting plate or nut 27, which is threaded into the interior of the tubular support 18 and may be secured by suitable means such as a set screw 27' in any desired position to predetermine the tension of the spring 26. Said spring 26 controls the action of the thermostat in response to temperature variations and also maintains the head 22' of the thermostat in engagement with the spider 20.

The stem 12 is constrained to rotate with tubular support 18 and thermostat 22 in any suitable manner, and in the form shown, the movable end wall 25 is provided with radially extending projections or ribs 25' which engage the posts 24. The pressure in the bellows and the spring 26 force the end wall 25 and posts 24 together so that the thermostat and the stem 12 are constrained to rotate together by the ribs 25'. The extent to which thermostat 22 may contract under the action of spring 26 may be limited by suitable means, as a tubular stop member 28 within the bellows, and the bellows is charged with thermo-sensitive fluid through a filling tube 29 which is thereafter sealed by suitable means, such as a plug and solder 30.

Suitable means, such as a ring 31, adjustably secured to the cap 14 by means of screws 32 and provided with a pointer or the like 33, serves to indicate the extent of rotation of the tubular support 18 with respect to the casing. If desired, the support 18 may be locked in any desired position by any suitable means such as a set screw 34 which may be tightened against the exterior threads on the member 17.

The device described above may be installed for example with the tail pipe 5 connected to a source of supply of a heating medium such as steam and with the tail pipe 4 connected to a radiator or other point to which said heating medium is to be delivered, the flow of said medium through the valve being automatically controlled by the thermostat 22 in accordance with variations in the temperature of the surrounding atmosphere. Preferably, the valve should be installed in such a position that the thermostat is subjected at all times to a free circulation of air at normal room temperatures and is not subjected to any unusually hot temperatures or cold draughts. In order that the thermostat shall be sensitive to temperature variations of the atmosphere, care is taken to prevent conduction of heat from the valve casing or pipes to the thermostatic element. In the embodiment illustrated, the thermostat 22 is thermally insulated from the valve casing 1 and pipes 4 and 5 by interposing between them heat insulating means which preferably constitute the means for supporting the thermostat from the valve casing and for connecting the thermostat with the valve. Thus the tubular member 17, tubular support 18, valve stem 12, and nut 27 may all be formed of a suitable material which is a poor conductor of heat, preferably a non-metallic material such as bakelite, so that the element 22 can respond to variations in temperature of the surrounding atmosphere without being influenced by heat conducted to said element from the valve casing, as is the case where the usual metal supporting and connecting elements are employed.

The operation of the device will be understood from the foregoing description. Assuming the valve 9 to be closed, when it is desired to open the same, the tubular support 18 and thermostat 22 are rotated by hand, the valve stem 12 being constrained to rotate therewith as above described, and the valve 9 being restrained against rotation by the corrugated wall 15. Relative rotation between the valve stem 12 and the stem 13 will cause the valve 9 to be moved away from its seat an amount depending upon the extent of rotation of the support 18 relative to the valve casing 1, and this may be gauged by the pointed 33, suitable marks being provided on the tubular support 18 to register with said pointer. When the valve is thus in an open position, changes in vapor pressure in the thermostat 22 due to change in the temperature in the surrounding atmosphere tend to expand the thermostat or to permit it to contract due to spring 26, valve stem 12 moving longitudinally relative to the support 18 and moving the valve 9 toward or away from its seat 8. The pressure that is required to close the valve 9 is determined by the distance it is necessary to compress the spring 26 and this in turn is determined by the distance through which the valve 9 must move in order to reach seat 8. Therefore, the vapor pressure, or in other words, the atmospheric temperature, at which the valve will be closed may be controlled by the extent of manual opening of the valve and the tubular support 18 may be graduated to indicate the temperature which will be maintained. The valve may be closed manually by rotating the support 18 in the proper direction. Fine adjustment may be made at the factory by relative rotation between the stems 12 and 13, the support 18 remaining stationary, and this may be accomplished by moving the thermostat head 22' out of frictional engagement with the spider 20 and then rotating the thermostat and stem 12 in the proper direction.

There is thus provided a thermostatically operated valve which can be opened or closed manually independently of the thermostatic operation thereof, but which when left open, will be automatically controlled by the thermostat to regulate the flow of a heating or cooling medium so as to maintain a desired temperature automatically. Moreover, the temperature which is to be maintained may be regulated by the extent of opening of the valve by hand. The entire construction is self-contained and is adapted to be installed as a unit, requires no adjustments other than the initial adjustment of the device made at the factory, and is very easily operated. The construction is simple and durable, and has few parts, so that it is economical to manufacture, while it is efficient and reliable in operation, and there is nothing that is apt to get out of order and require servicing. Leakage from the valve is effectively prevented by the seal afforded by the flexible wall 15 connecting the valve 9 with the valve casing 1, and the bellows element is thoroughly insulated against conduction of heat from the valve casing thereto.

While only one embodiment of the invention has been described and illustrated in the drawing, it will be apparent that the invention is capable of a wide variety of mechanical expressions, and that changes may be made in the form, details of construction, and arrangement of parts, without departing from the spirit of the invention. Reference is therefore to be had to the appended claims for a definition of the limits of the invention.

What is claimed is:

1. In a device of the class described, a valve casing having a valve seat formed therein, a valve movable toward and away from said seat, a valve stem having threaded connection with said valve, a thermostat operatively connected with said stem to operate said valve, and manually operable means carrying said thermostat and cooperating with said thermostat and valve stem to rotate said valve stem relative to said valve to open and close said valve.

2. In a device of the class described, a valve casing having a seat formed therein, a non-rotatable valve movable rectilinearly toward and away from said seat, a thermostat, a valve stem rotatable and rectilinearly movable in said casing and operatively connecting said thermostat and said valve, said stem having a threaded connection with said valve, and a manually operable member carrying said thermostat and rotatably mounted on said casing, said member, thermostat and valve stem being interconnected to rotate together for opening and closing said valve.

3. In a device of the class described, a valve casing having a valve seat formed therein, a valve movable toward and away from said seat, a rotatable support, a thermostat carried by said support, and a valve stem operatively connecting said thermostat and said valve and rotating with said support, said valve stem having a threaded connection with said valve for opening and closing said valve by relative rotation of said stem and valve.

4. In a device of the class described, a valve casing having a valve seat therein, a valve movable toward and away from said seat, a thermostat, a valve stem operatively connecting said thermostat and said valve and operable by expansion and contraction of said thermostat, a manually rotatable member mounted on said casing, means whereby said thermostat rotates with said member and means operable on rotation of said member and thermostat to vary the effective length of said valve stem.

5. In a device of the class described, a valve casing having a seat therein, a valve cooperating with said seat, a valve stem having threaded engagement with said valve, means for retaining said valve against rotation with said stem, a thermostat operatively connected with said stem to operate said valve, and manually operable means carrying said thermostat and operable to rotate said thermostat and valve stem relative to said valve.

6. In a device of the class described, the combination of a casing having a valve seat therein, a valve cooperating with said seat, a flexible wall connecting said valve and said casing, a support rotatably mounted on said body, a thermostat carried by said support, and a valve stem operatively connecting said thermostat and said valve and rotating with said support, said valve stem having a threaded connection with said valve.

7. In a device of the class described, a valve casing having a seat therein, a valve cooperating with said seat, a thermostat rotatably mounted on said casing, a valve stem operatively connecting said thermostat and said valve and rotatable by said thermostat, and means operable on rotation of said thermostat to vary the effective length of said valve stem.

8. In a device of the class described, the combination of a valve casing and seat, a valve movable rectilinearly toward and away from said seat, means preventing rotary movement of said valve, a thermostat mounted on said casing, a valve stem operatively connecting said thermostat and said valve, said stem being rotatable and rectilinearly movable in said body, threaded means connecting said stem with said valve, and a manually rotatable member mounted on said casing and carrying said thermostat, said rotatable member, said thermostat and said stem being interconnected to rotate together whereby rotation of said member operates said valve independently of said thermostat.

9. In a device of the class described, the combination of a valve casing and seat, a valve movable toward and away from said seat, a rotatable support mounted on said casing, a thermostat carried by said support, a valve stem extending through said support and rotated therewith, said stem operatively connecting said thermostat and said valve, and means operable on rotation of said support to vary the effective length of said valve stem.

10. A device of the class described, comprising a casing having a valve seat therein, a valve cooperating with said seat, means for preventing rotation of said valve, a support rotatably mounted on said casing, a thermostat carried by said support, a valve stem extending through said support and rotating therewith, resilient means maintaining said stem in engagement with said thermostat, and threaded connecting means between said stem and said valve.

11. In a device of the class described, a valve casing having a seat therein, a valve movable toward and away from said seat, a support rotatably mounted on said casing, a thermostat carried by said support, a valve stem extending through said support and rotating therewith, said stem operatively connecting said thermostat and valve, a flexible wall connecting said valve and said casing, and means operable on rotation of said support to vary the effective length of said valve stem.

12. A device of the class described, comprising a valve casing having a seat therein, a valve movable toward and away from said seat, a rotatable support mounted on said casing, a thermostat carried by said support, a stem extending through said support and rotating therewith, resilient means maintaining said stem in engagement with said thermostat, threaded connecting means between said stem and said valve, and a flexible wall connecting said valve and said casing.

13. A device of the class described, comprising a valve casing having a seat therein, a valve movable toward and away from said seat, a thermostat mounted on said casing, a valve stem interposed between said thermostat and said valve, resilient means opposing expansion of said thermostat, threaded connecting means between said stem and said valve, a manually rotatable member mounted on said casing, and means connecting said member and said stem for rotation, whereby rotation of said member moves said valve independently of said thermostat.

14. A device of the class described, comprising a valve casing having a valve seat therein, a valve cooperating with said seat, means for preventing rotation of said valve, a valve operating means comprising a support rotatably mounted on said casing and a thermostat carried by said support, a valve stem operatively interposed between said valve and said thermostat and extending through said support, said stem being mounted for rotation with said support and free longitudinal movement therethrough, and threaded connecting means between said stem and said valve.

15. A device of the class described, comprising a valve casing having a valve seat therein, a valve cooperating with said seat, means for preventing rotation of said valve, a valve operating means comprising a support rotatably mounted on said body and a thermostat carried by said support, a valve stem operatively interposed between said valve and said thermostat and extending through said support, said stem being mounted for rotation with said support and free longitudinal movement therethrough, resilient means opposing expansion of said thermostat, and threaded connecting means between said stem and valve.

16. In a device of the class described, the combination of a valve casing having a seat therein, a valve cooperating with said seat, means for preventing rotation of said valve, a valve operating means comprising a rotatable support mounted on said casing and a thermostat carried by and rotatable with said support, and a valve stem rotatable with said support operatively connected with said thermostat and having a threaded connection with said valve, said support and valve stem being formed of a material that is a poor heat conductor.

17. In a device of the class described, the combination of a valve casing having a valve seat therein, a valve movable toward and away from the seat, means for preventing rotation of said valve, a rotatable support, a thermostat mounted to rotate with said support and disengageably connected thereto, and a valve stem operatively connecting said thermostat and said valve and rotating with said thermostat, said valve stem having a threaded connection with said valve.

18. In a device of the class described, the combination of a valve casing having a seat therein, a valve cooperating with said seat, a manually rotatable member mounted on said casing, a thermostat rotating with said member and disengageably connected thereto, a valve stem operatively connecting said thermostat and said valve, and means operable on rotation of said thermostat to vary the effective length of said valve stem, said thermostat being disengageable from said member for rotation independently thereof.

19. In a device of the class described, the combination of a valve casing and seat, a valve movable toward and away from said seat, a rotatable support mounted on said casing, a thermostat carried by said support and frictionally engaging the same for rotation therewith, a valve stem extending through said support and rotated with said thermostat, said stem operatively connecting said thermostat and valve, and means operable on rotation of said thermostat to vary the effective length of said valve stem, said thermostat being movable out of frictional engagement with said support for rotation independently thereof.

20. In a device of the class described, the combination of a valve casing and seat, a valve movable toward and away from said seat, a rotatable support mounted on said casing, a thermostat carried by said support, resilient means maintaining said thermostat in engagement with said support for rotation therewith, a valve stem operatively interposed between said thermostat and valve and extending through said support, said stem being freely movable in said support and being connected with said thermostat for rotation and longitudinal movement therewith, and threaded connecting means between said stem and valve, said thermostat being movable against the tension of said resilient means out of engagement with said support for independent rotation.

In testimony whereof I have signed this specification.

JEAN V. GIESLER.